United States Patent [19]

Wada et al.

[11] Patent Number: 4,626,071
[45] Date of Patent: Dec. 2, 1986

[54] OPTICAL FILTER MADE OF INORGANIC MATERIAL FOR RED LIGHT

[75] Inventors: Masatoshi Wada; Shigekazu Matsubara; Yukikazu Moritsu, all of Osaka; Tetsuo Sakai, Tokyo, all of Japan

[73] Assignees: Okuno Chemical Industries Co., Ltd.; Nippon Hoso Kyokai, both of Japan

[21] Appl. No.: 744,999

[22] Filed: Jun. 17, 1985

[51] Int. Cl.⁴ .............................................. G02B 5/20
[52] U.S. Cl. .................................... 350/311; 252/582
[58] Field of Search ................ 350/1.1, 1.6, 311, 313, 350/314, 317; 354/1; 358/253; 252/582, 584; 428/426, 432, 688, 689, 913, 918

[56] References Cited

U.S. PATENT DOCUMENTS

| | | | |
|---|---|---|---|
| 3,400,006 | 9/1968 | Berning et al. | 252/582 |
| 3,826,751 | 7/1974 | Laliberte | 350/1.1 |
| 4,106,946 | 8/1978 | Ritze | 252/582 |
| 4,197,230 | 4/1980 | Baney et al. | 350/1.1 |
| 4,297,142 | 10/1981 | Ritze | 252/582 |
| 4,383,018 | 5/1983 | Martin et al. | 350/311 |

Primary Examiner—John K. Corbin
Assistant Examiner—Loha Ben
Attorney, Agent, or Firm—Parkhurst & Oliff

[57] ABSTRACT

An optical filter made of inorganic material for red light which transfers red light and absorbs all of the other colored lights can be realized by sticking an inorganic mixture powder pasted by mixing with screen oil on a glass substrate and firing it. The mixture includes sulfates of copper, alkali metal and alkali earth metal. The contrast of the picture displayed on a display device can be increased significantly by reducing the reflection of incident ambient light without the reduction of brightness on account of the application of the above optical filter onto the displaying screen thereof.

7 Claims, 10 Drawing Figures

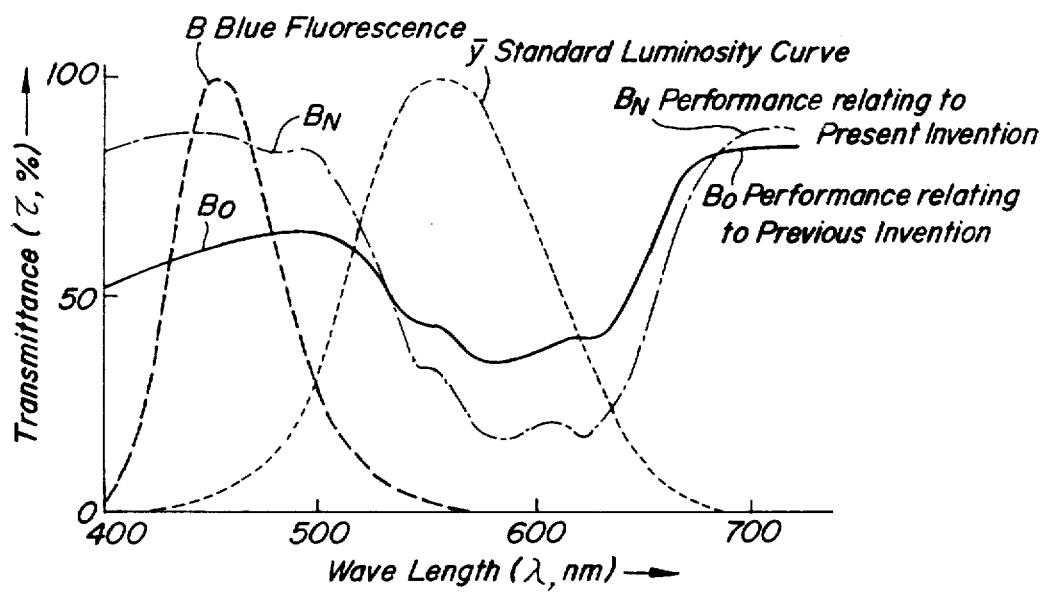
FIG_3
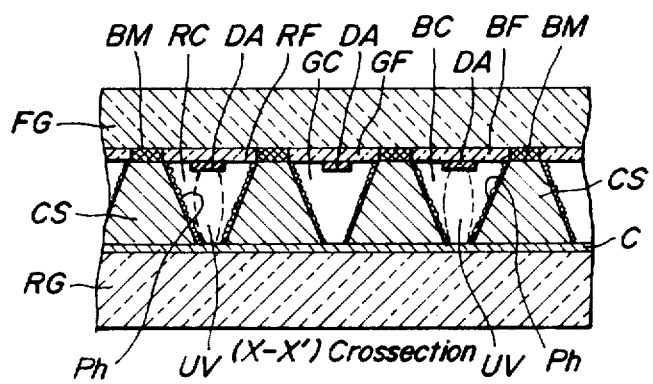
FIG_4a
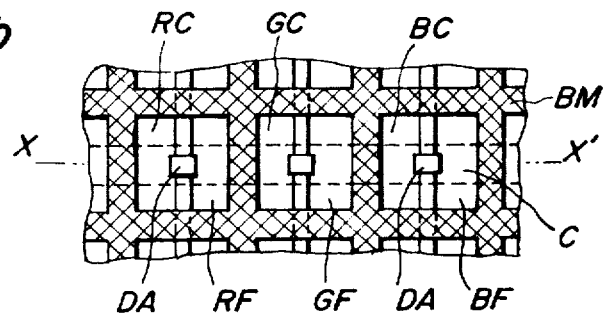
FIG_4b

FIG_5
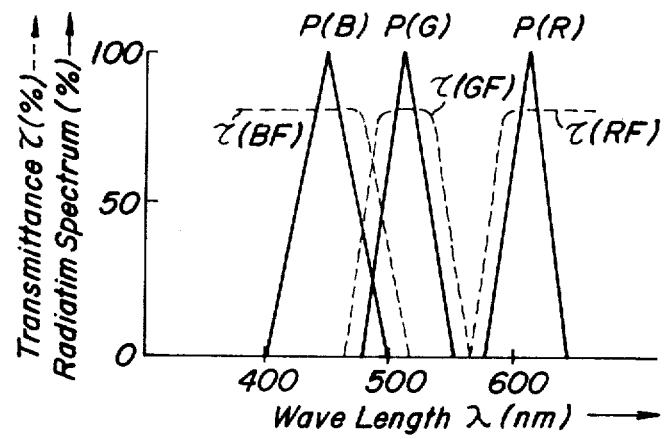
FIG_6a
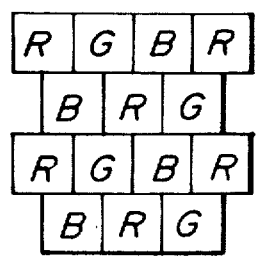
FIG_6b
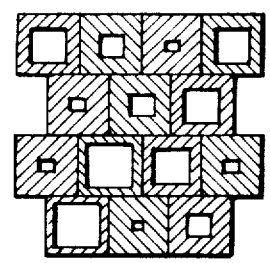

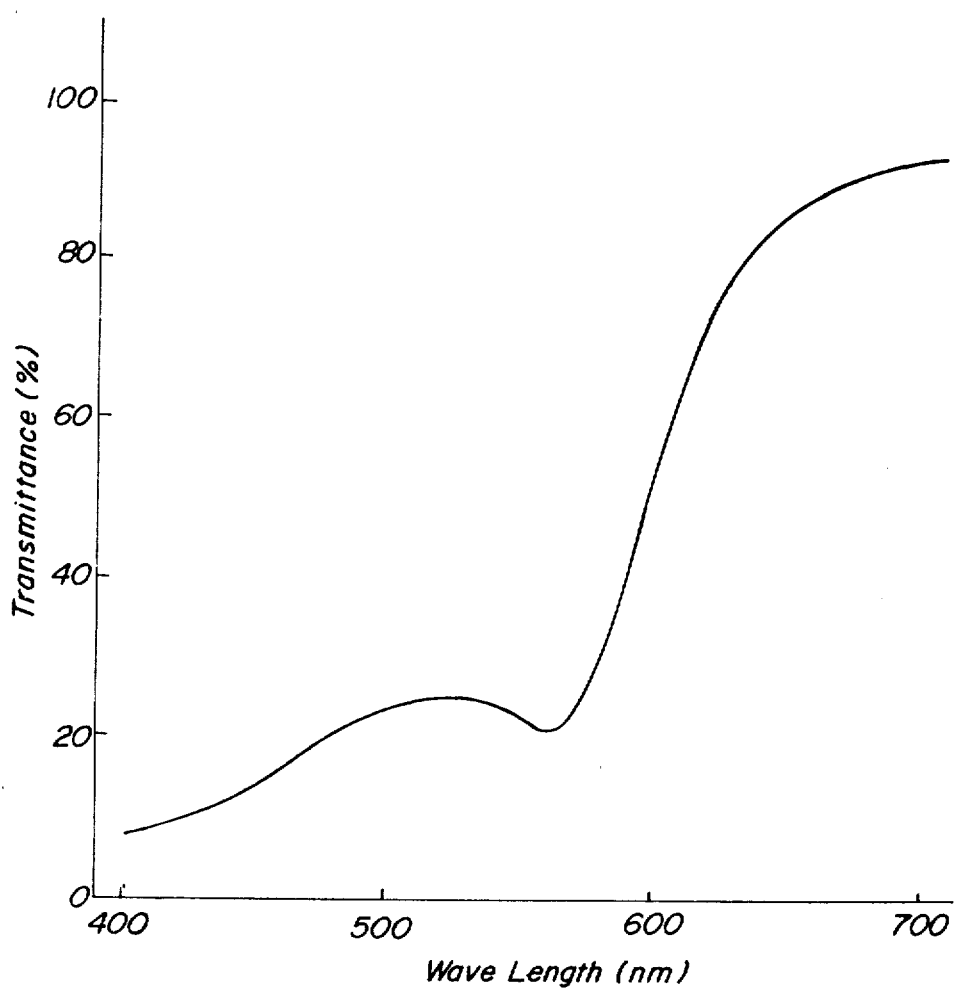
FIG_7

OPTICAL FILTER MADE OF INORGANIC MATERIAL FOR RED LIGHT

BACKGROUND OF THE INVENTION

A. Field of the Invention

The present invention relates to an optical filter made of inorganic material for red light, provided for the application to a display device consisting of a combination of plural kinds of displaying elements emitting different colored lights respectively, particularly with high contrast based on antireflection with low reflectance of ambient light.

B. Description of the Prior Art

Generally, it is required for various kinds of display devices, for instance, a cathode ray tube, a gas-discharge display panel and a low-velocity electron-beam fluorescent display panel, to increase not only the brightness but also the contrast of the display by lowering the reflectance of the displaying surface. So that, if the required level of the brightness of display can be obtained in any manner, the quality of display can be occasionally improved by increasing the contrast thereof.

For lowering the reflectance of the displaying surface in order to increase the contrast thereof, the following various measures have been conventionally adopted.

(i) A neutral density (ND) filter of the absorbing type is sticked or combined to a surface of a display screen made of glass plate and the like.

(ii) The light absorption of the display screen, at a region wherein the radiation spectral intensity of fluorescent material forming the display element is low, is increased by adding a rare earth element, for instance $Nd_2O_3$, into a material, for instance glass, of the display screen.

(iii) The light absorption of the display screen is increased to correspond to the light wavelength emitted from the display radiation region by mixing a pigment into the fluorescent material forming the display element.

(iv) The absorption of ambient light is increased by sticking a black material on portions of the display element other than the fluorescent material.

(v) Granular pigments sticked on the fluorescent material are employed as for a filter.

However, the above conventional measures for increasing the contrast have the following defects respectively.

The increase of contrast according to the application of the ND filter as mentioned in Item (i) is accompanied by the lowered brightness.

Although the result obtained by adding the rare earth element into glass as mentioned in Item (ii) is more favorable than that obtained by the above measure of Item (i), the luminous reflectance is not so lowered, since the light transmittance of the added material in the vicinity of the wavelength 55 nm is high.

The mixing of the pigment into the fluorescent material as mentioned in Item (iii) is effective for the CRT display device which has a surplus brightness of display. However, the application thereof onto the other display devices which cannot afford the brightness of display seems to be difficult, meanwhile the lowered degree of reflectance thereof seems to be no more than one half at most in practice.

The sticking of black absorbing material on other portions than that emitting the light as mentioned in Item (iv) is effective for all display devices. However, this measure is no more than subsidiary.

The sticking of granular pigments onto the fluorescent material as for the filter is not useful in practice, since the pigment contained in the filter accentuates the granulation, the boundary of which causes the increased reflection based on the scattering of light. In addition, a gap between the front glass and the filter layer, even if trifling, causes the reflection of light at the boundary thereof and hence the lowered contrast.

The present inventors have previously conceived a color display device employing an optical filter made of inorganic material which effectively increases the contrast of the display device, particularly, the color picture display device by removing the above described conventional defects and hence by suppressing the reduction of the brightness of display and have filed a patent application thereof referred to Japanese Patent Laid-open Publication No. 59-36,280.

As described in this publication, in the display device formed of a combination of plural kinds of respectively different displaying elements, the contrast of the picture consisting of colored lights emitted by those displaying elements respectively is increased almost by four times by employing an optical filter formed of substantially transparent inorganic glasses through which those colored lights are transmitted respectively, in comparison with the contrast obtained without this optical filter, that is, the combination of three color filters of red, green and blue. Further, the reduction of the brightness, which accompanies the application of the filters, is about 20%.

SUMMARY OF THE INVENTION

An object of the present invention is to provide an optical filter made of inorganic material for red light which is accomplished by detailed investigation of the inorganic materials and accumulated trial productions of products under the dissatisfaction with the optical filter of this kind as described in the above mentioned Japanese Patent Laid-open Publication No. 59-36,280.

It has been clarified from the results of the above mentioned investigation and trials that newly found inorganic materials and further favorable ranges of composition ratios between those materials can be adopted not only for the conventional improvement of the contrast but also for the increase of the color saturation and further the coloring of substantially uncolored radiation and hence, for instance, for the favorable application onto the high definition television gas-discharge display device.

The present invention relating to the optical filter for red light among three primary color lights is featured in that an optical filter made of inorganic material for red light is manufactured by sticking inorganic material consisting indispensably of 1 to 70 parts by weight of copper sulfate, 20 to 90 parts by weight of alkali metal sulfate and 10 to 80 parts by weight of alkali earth metal sulfate to a glass substrate and firing it thereafter.

In FIG. 1, the characteristic curve ($R_N$) of the transmission factor ($\tau$) of the aforesaid optical filter for red light according to the present invention is shown in comparison with the spectrum characteristics (R) and the visual sensitivity characteristic curve ($\bar{y}$) of the display device to which the present invention should be applied and the transmission factor characteristic curve ($R_0$) of the optical filter for red light as described in the above Japanese Patent Laid-open Publication No. 59-36,280.

As shown in FIG. 1, the transmission factor is favorably improved in the desired region of the spectrum characteristics (R) of the fluorescent material for red light, meanwhile the transmission factor is decreased in other regions thereof. As a result, synthetically speaking, the contrast ratio is improved by about one and half times even only for red light in comparison with that as attained in the above Japanese Patent Laid-open Publication.

BRIEF DESCRIPTION OF THE DRAWINGS

For the better understanding of the invention, reference is made to the accompanying drawings, in which:

FIGS. 1 to 3 are diagram showing the characteristic curves of the transmittances of the optical filters for red, green and blue lights according to the present invention respectively in comparison with other relevant characteristic curves;

FIGS. 4(a) and 4(b) are a cross-section and a plan showing a gas-discharge display panel applied with the optical filter of the present invention;

FIG. 5 is a diagram showing an idealized relation between the radiation spectrums of fluorescent materials used for the gas-discharge color display panel and spectral transmittance characteristics of the respective primary color filters according to the present invention;

FIGS. 6(a) and 6(b) are diagrams showing examples of the fixed display applied with the optical filters of the present invention respectively; and FIGS. 7 and 8 are diagrams showing characteristic curves of spectral transmittance and spectral reflectance of an example of the concrete product of the present invention respectively.

Figure 1:
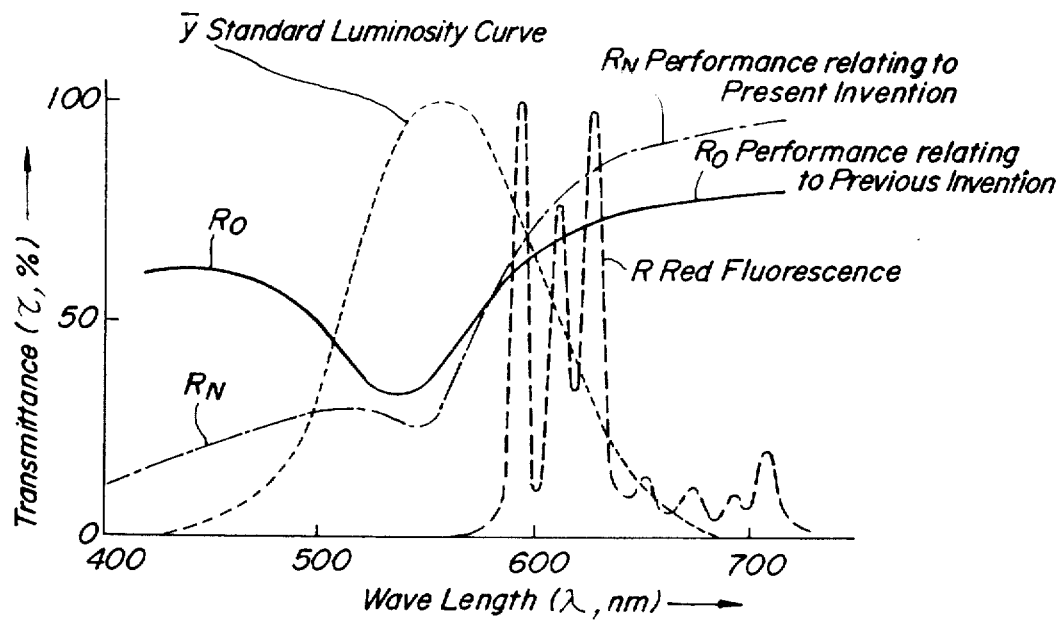

Throughout different views of the drawings, FG is front glass plate, RG is rear glass plate, CS is cell sheet, Ph is fluorescent material, DA is display anode, C is cathode, UV is ultraviolet ray, RF is filter for red light, GF is filter for green light, BF is filter for blue light, BM is black matrix, RC is cell for red light, GC is cell for green light and BC is cell for blue light.

DESCRIPTION OF THE PREFERRED EMBODIMENTS

The outline of the manufacturing process of the optical filter according to the present invention and technical matters including screen oils, filter materials and others required for the above manufacturing process will be described in order hereinafter.

(I) Glass materials required for the filter substrate:

A mixture composed, for instance, as follows is previously pulverized by a ball-mill and thereafter is mixed with screen oil into a paste.

Copper sulfate: 1 to 35 parts by weight
Alkali metal sulfate (anhydride): 30 to 50 parts by weight
Alkali earth metal sulfate: 15 to 30 parts by weight In addition, if necessary, an inorganic filling material is added thereto by an appropriate amount for obviating blurred patterns thereof. The like measures other than paste will be described later in a lump.

The above mentioned paste is printed on the glass substrate so as to form desired patterns. In this situation, it is required that the surface of the glass substrate to be printed is slightly permeated by tin, so that it is satisfactory to employ float glass as for the substrate. Otherwise, it is preferable to stick tin on the glass substrate and then to make it permeate thereinto, for instance, by heating at high temperature, so as to obtain the tin-permeated layer of sufficient thickness less than 1,000 Å.

The printed glass substrate is fired at a temperature between 520° C. and 700° C., and then the remnants are washed away by water, so as to obtain the desired optical filter.

The above procedure will be described in detail hereinafter.

The first example of the composite material for coloring glass according to the present invention is formed by mixing an inorganic mixture powder composed of, for instance, copper sulfate 1 to 70 parts by weight (calculated in terms of anhydride; ditto hereinafter), alkali metal sulfate 20 to 90 parts by weight, alkali earth metal sulfate 10 to 30 parts by weight and inorganic filling material 5 to 50 parts by weight together with an organic vehicle, so as to form a superficial portion colored in red of a glass substrate by the ionic substitution effected by the application thereof on the surface of the glass substrate.

This composite material of the present invention is favorable to readily draw arbitrary patterns on the surface of the glass substrate by screen printing and the like on account of the formation by mixing the inorganic mixture powder and the organic vehicle and to produce a transparent superficial layer colored in red and provided with sharp boundaries between applied and non-applied portions, ample discriminability based on distinct contrast superficial smoothness maintained through the permeation into the substrate, by virtue of firing after the application thereof on the surface of the glass substrate. Consequently, the employment of the composite material of the present invention facilitates the colored display of letters, figures and the like on a surface of glass plate and the decoration of glass products, as well as the manufacture of colored glass products being useful, for instance, as for the color filter and the like.

It is important for the glass coloring material according to the present invention to employ the above-specified inorganic mixture powder. Particularly, copper sulfate is indispensable for the coloring reaction based on the ionic substitution, so that, when the amount thereof is less than one part by weight, the coloring in red becomes difficult. Meanwhile the upper limit of composition rate thereof is determined in relation to the other constituents, so that, when the amount thereof exceeds 70 parts by weight, the composition rates of the other indispensable constituents used in common become too small and hence the effect of composition cannot be expected.

As for the alkali metal sulfate used in common with copper sulfate, lithium sulfate, sodium sulfate and potassium sulfate, desirably sodium sulfate can be exemplified.

As for alkali earth metal sulfate, zinc sulfate, calcium sulfate, magnesium sulfate and barium sulfate, desirably zinc sulfate can be exemplified. These alkali metal sulfates in the range of 20 to 90 parts by weight and these alkali earth metal sulfates in the range of 10 to 80 parts by weight are used in common, and, as a result, these common used sulfates together with copper sulfate are melted into a liquid state on the glass substrate. So that, the adhesiveness of the inorganic material of the present invention onto the surface of the glass substrate is increased, meanwhile the coloring reaction effected by the copper ionic constitution of copper sulfate is promoted by the synergism of both of common-used sulfates, and, as a result, the coloring in deep red is facilitated by the employment of a little amount of copper sulfate. Particularly, the composition of alkali earth metal sulfate in the above range is effective for the coloring in deep red, so that, when this sulfate is less than ten parts by weight, it is difficult to effect the coloring in favorable red by employing copper sulfate in the above range.

In addition, it is necessary to combine the required amount of inorganic filling material with the inorganic mixture powder according to the present invention. This combination of the inorganic filling material contributes to the appropriate screen printing of the resultant composite, particularly to obtain the sharp design of the drawings effected by the above screen printing and further additionally prevents of the shrinkage of the aforesaid melted liquid in the firing subsequent to the application thereof onto the substrate and the controlling action for the depth of the presented color tone. The various kinds of conventionally well-known heat-resisting inorganic materials can be used for this inorganic filling material. Typically, the following can be exemplified.

alumina ($Al_2O_3$)
titanium oxide ($TiO_2$)
zirconia ($ZrO_2$)
zirconium silicate ($ZrSiO_4$)
calcium carbonate ($CaCO_3$)
iron oxide ($Fe_2O_3$)

In addition, the above inorganic mixture powder can be, if necessary, combined with a little amount of silver salt, for instance, silver nitrate ($AgNO_3$), silver oxide ($Ag_2O$), silver sulfate ($Ag_2SO_4$) and silver sulfide ($Ag_2S$).

The above inorganic mixture powder can be compounded by mixing chemical compounds of each of the constituents in the usually obtainable state of powder. This mixing can be favorably effected by employing dry or wet (methanol) pulverizers, for instance, a pot mill, a ball mill and the like, the most favorable granularity thereof being adjusted in a range of 0.1 to 20 $\mu$m. The granularity in this range is suitable to secure the favorable transfer through screen and the sharp drawing in the screen printing of the above mixture powder.

In this connection, the above inorganic mixture powder can be printed also by usual methods other than screen printing, for instance, spray printing, brush printing, roll-coater printing, transcription using transfer paper and the like. For these usual printing methods, the above granularity can be further roughened, for instance, to about 50 $\mu$m.

The inorganic material according to the present invention is compounded by mixing the above compounded inorganic mixture powder and the organic vehicle. In this connection, the organic vehicle can be selected from the group of organic solvents, oils and waxes. As for the organic solvents, conventional solvents customarily used in the fields of printing and painting, for instance, cellosolve descent solvents including butyl carbitol, butyl carbitol acetate and others and usual solvents including dichloromethane, acetone, acetonitrile, diethyl ether and others can be adopted. As for the oils, high boiling point oils including terpineol, pine oil and others can be adopted individually, as well as in combination with viscosity increasing agents consisting of one of acrylic resins including methyl methacrylate resins, butyl methacrylate resin and others, one of cellulose resins including ethyl cellulose, nitrocellulose and others and one of rosin derivatives including rosin amine D and others. Particularly, a combination of the high boiling point oil with one of the so-called favorably burnt-out resins including the above acrylic resins, the above cellulose resins and the like and one of the so-called comparatively unfavorably burnt-out resins including the above rosin derivatives and the like in common is suitable to the application for obtaining the paste having the better adhesiveness to the glass substrate and the evident effect of coloring the glass. As for the waxes, all of conventional waxes which are present in the solid state at room temperature and are readily melted by slight heating into the liquid state being suitable to the screen printing and the like can be employed. In this connection, the inorganic material of the present invention can be regarded as the so-called hot melt type composite by the above mentioned waxes.

The combination rate of the above mentioned organic vehicle is not specifically restricted, so long as the resultant composite presents any of liquid state, pasty state and solid state of the hot melt type, which states facilitate the application thereof on the surface of the glass substrate, but can be suitably determined in response to the kind of available chemical compound or to the composition of the above inorganic mixture powder. It is usually suitable to set up this combination rate of about half to one part by weight with regard to the inorganic mixture powder.

The above mixing of the inorganic mixture powder and the organic vehicle can be readily carried out, for instance, by effecting the roller thereon after provisionally mixing each of the constituents by the mortar and pestle.

The inorganic material compounded as described above according to the present invention is applied on the surface of the glass substrate to be colored through the usual methods. That is, the material in pasty or hot-melt state is painted by screen printing and the like, meanwhile the material in liquid state is painted on the glass substrate by spray painting, brush painting, roll-coater painting or transcription printing provided with transfer papers.

After the above painting, the surface of the fired glass substrate is washed by water, so as to obtain the glass product colored in desired color. In this connection, the temperature and the time duration for the firing are somewhat varied in response to the composition of the inorganic material of the present invention, the thickness and the kind of glass substrate. The firing is suitably effected at the temperature usually ranged about 500° to 700° C. and desirably ranged 560° to 650° C. during the time extended into about 3 to 10 minutes, desirably about 5 minutes.

The inorganic material of the present invention can be applied by processing as described above for the glass material employed for the conventional glass plate, that is, generally for hard glasses ($\alpha = 30 \sim 60 \times 10^{-7}$/°C.) including soda-lime glass, borosilicate glass and the like, particularly glassy materials including float glass and the like also. As for the float glass, regardless of the tinned or the non-tinned surface thereof, although the colorability is somewhat lowered for the non-tinned surface, glass products colored in desired favorable red can be obtained.

Various concrete embodiments of the present invention will be described further in detail hereinafter.

CONCRETE EXAMPLE 1

C.P. grade copper sulfate.penta-hydrate 180 g (calculated in terms of unhydrate 115 g), C.P. grade sodium sulfate 470 g, C.P. grade zinc sulfate 215 g and titanium oxide ($TiO_2$) 200 g together with methanol 1.5 l are pulverized into mixture by the pot mill during two days. The obtained slurry is bolted through a 120 mesh bolt after drying into an inorganic mixture powder (average granularity approximately less than 5 μm).

The above mixture powder 100 parts by weight is mixed with oil 50 parts by weight having the following composition into a glass-coloring material in a pasty state according to the present invention.

Oil:
pine oil: 80% by weight
butyl carbitol: 10% by weight
ethyl cellulose: 6% by weight
rosin amine D: 2% by weight
lecithin: 1% by weight The above composite is screen-printed on a tinned and a non-tinned surface of a float glass plate through 250 mesh nylon screen respectively. These surfaces are fired for five minutes respectively at the firing temperature 560° C., 600° C. and 640° C., and thereafter the firing remnants are washed away by water. As a result, a glass product colored in the desired transparent deep red can be obtained.

Figure 8:
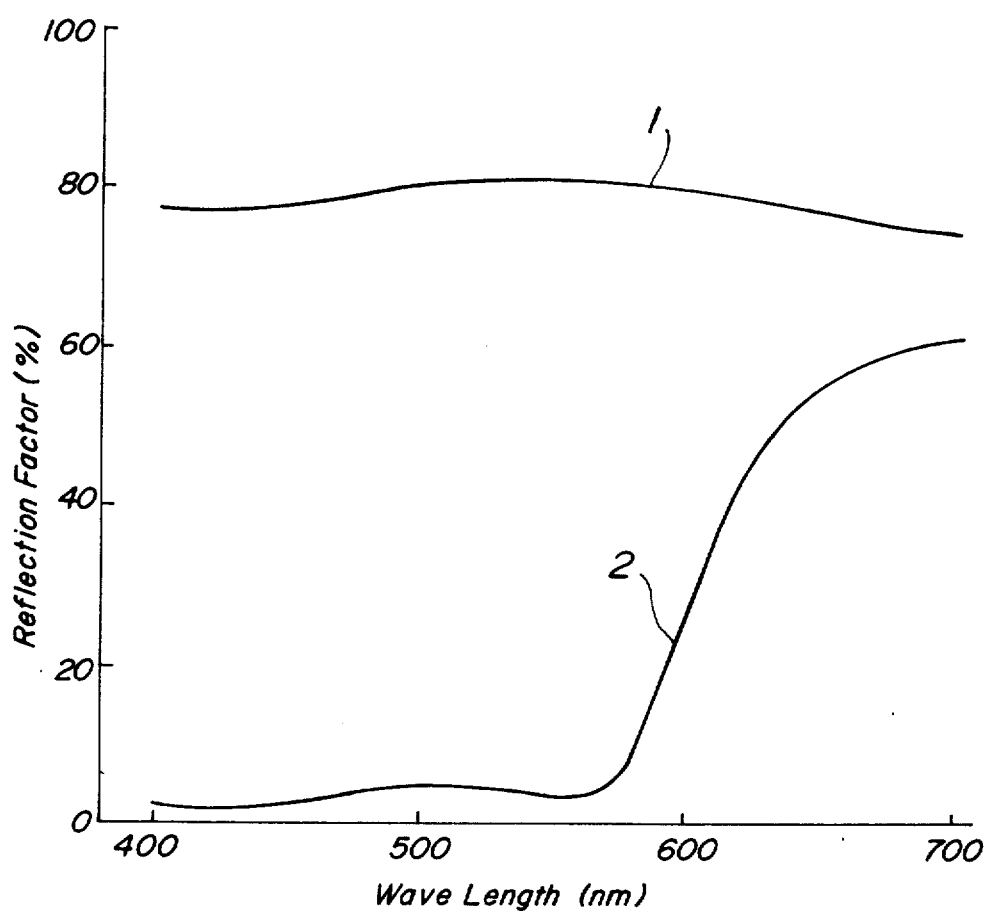

The spectrotransmittance obtained from the resultant glass product (applied with the above composite on the tinned surface thereof and fired at temperature 600° C.) is shown in FIG. 7, meanwhile the spectral reflectance (measured through a reflectance measuring apparatus provided with Hitachi 200-0531 integrating sphere and inserted with a white plate having a reflectance 100% behind the glass product) obtained from the same is shown in FIG. 8.

In these drawings, the wavelength (nm) is plotted on the abscissas, meanwhile the transmittance is plotted on the ordinate in FIG. 7 and the reflectance is plotted on the ordinate in FIG. 8. In this connection, the curve 1 in FIG. 8 is plotted with regard to the glass product applied with the composite of the present invention, meanwhile the curve 2 in FIG. 8 is plotted with regard to an uncolored float glass (controlled as for a sample to be compared).

It is apparent from these drawings FIGS. 7 and 8 that the colored glass obtained by the application of the inorganic material according to the present invention presents the favorable coloring in red together with the lowered reflectance, and hence the excellent optical filter for red light can be realized.

CONCRETE EXAMPLE 2

The inorganic mixture powder 100 parts by weight having the same composition with that in Concrete Example 1 is heated and mixed with the wax 50 parts by weight having the following composition and then cooled into a hot-melt type composite of the present invention.

Wax:
high fatty alcohol: 75 parts by weight
polyethylene glycol 1540: 10 parts by weight
acrylic resin: 5 parts by weight
rosin: 8 parts by weight
ethyl cellulose: 2 parts by weight The resultant composite is screen-printed on the tinned surface of the float glass plate after heated and melted, similarly as in Concrete Example 1, and thereafter fired and washed away by water. As a result, a glass product colored in transparent red presenting the spectral transmittance similar as in Concrete Example 1 can be obtained.

CONCRETE EXAMPLES 3 TO 7

Similarly as in Concrete Example 1, the inorganic mixture powders respectively having the compositions as shown in Table 1 (each has an average granularity less than 5 μm) can be obtained.

TABLE 1

|  | Example 3 | Example 4 | Example 5 | Example 6 | Example 7 |
| --- | --- | --- | --- | --- | --- |
| Copper sulfate penta-hydride (calculated in terms of anhydride) | 1.56 (1) | 7.8 (5) | 15.6 (10) | 23.4 (15) | 31.2 (20) |
| Sodium sulfate | 54 | 50 | 45 | 40 | 40 |
| Zinc sulfate | 25 | 25 | 25 | 25 | 20 |
| Alumina | 20 | 20 | 20 | 20 | 20 |

Each of the above inorganic mixture powders 100 parts by weight is mixed with the oil 50 parts by weight having the same composition with that in Concrete Example 1 into the pasty state composite of the present invention.

The resultant composite is screen-printed on the tinned surface of the float glass plate similarly as in Concrete Example 1, and thereafter fired and washed away by water. As a result glass products colored in transparent red respectively having color tones as shown in Table 2.

TABLE 2

| Example No. | Firing temperature (°C.) (firing time 5 minutes) | | |
| --- | --- | --- | --- |
|  | 560 | 600 | 640 |
| 3 | light red | light red | red |
| 4 | light red | red | red |
| 5 | red | red | red |
| 6 | red | red | red |
| 7 | red | red | red |

Colored portions of the colored glass products obtained as for the above examples are in extreme so smooth as undistinguishable from the other uncolored portions of material glass products except for the color tones which present extremely distinct and sharp boundaries (contours) of variation. In addition, each of these composites presents the excellent property for screen-printing.

The spectral transmittances of the above examples are measured similarly as those of Concrete Example 1. As a result, similar characteristic curves presenting the coloring in red similarly can be obtained with regard to all of these examples, meanwhile the spectroreflection factors of all of these examples are sufficiently low.

(II) The remaining technical subjects

The screen printing is effected through screens of 100 to 400 meshes in response to the fineness of the pattern to be printed. In this connection, the black matrix and the like can be printed and fired together with the pattern to be printed.

The above described various kinds of transparent glass pastes are uniformly applied onto glass substrates and then dried at the temperature about 150° C. or half-fired at the temperature about 300° C. Thereafter, the conventional positive or negative photoresist for removing the oxidized film is applied thereon and after the photomask is applied on the portions thereof to be removed or to be left through the etching, the exposure is effected thereon, and then, after the development, unnecessary portions thereof are removed by the etching liquid, for instance, of hydrofluoric acid descent. This etching process is repeated, if necessary, with regard to required plural colors.

In this connection, it is also possible that the above described transparent glass paste consisting of glass material powder, after mixed with photosensitive photoresist, is applied on the glass substrate, and then, after drying, the glass substrate applied with the glass paste is etched by the resist-developing liquid.

As for the material of the photosensitive photoresist used for the etching procedure, various kinds of photoresists which are customarily employed for the production of semiconductor devices, other than polyvinyl alcohol and ammonium dichromate, which are usually adopted for the manufacture of conventional cathode ray tube, can be employed.

Similarly as already employed for the application of fluorescent materials, some of the chemicals present the selective adhesiveness in response to desired patterns under the application and the exposure. In the situation where the above described glass powder for the optical filter is applied on the patterns presented by these chemicals, the required patterns of glass powder adhering the glass substrate can be readily obtained. So that, after the subsequent fixing and the removal of impurities, the required optical filter can be realized by firing.

Figure 2:
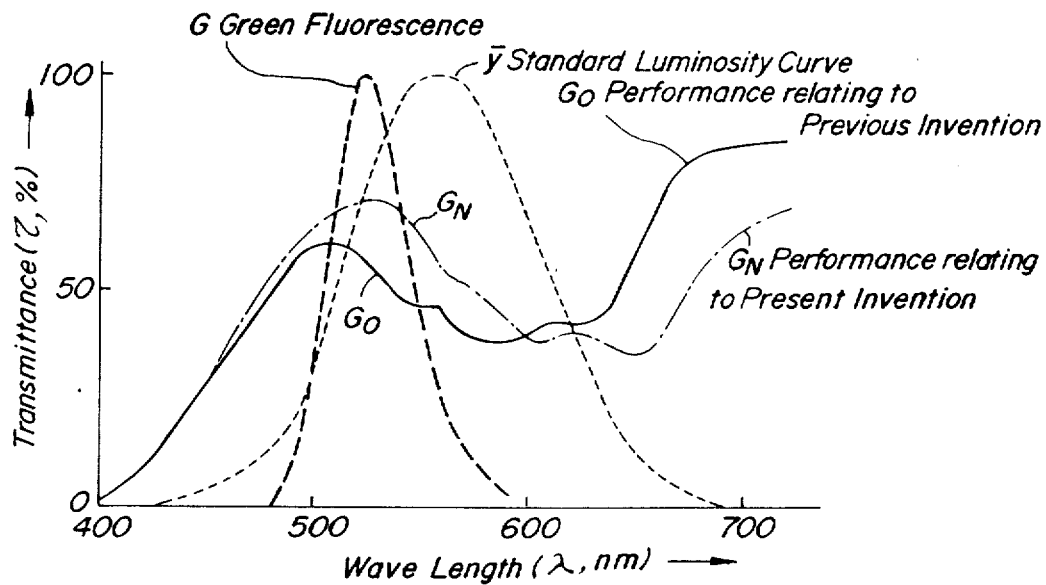

Next, various embodiments of the application of the optical filter according to the present invention will be individually described with regard to the respective operations and effects thereof hereinafter by referring to the accompanying drawings. Particularly with regard to the color display device necessitating the common application of those optical filters for red, green and blue lights, the operation and the effect of the common application of these three kinds of the optical filters according to the present application will be described by referring to FIG. 1 showing the performance of the optical filter for red light together with FIGS. 2 and 3 showing those for green and blue lights respectively.

Firstly, with regard to a gas discharge display panel applied with these three kinds of optical filters, the cross-section thereof is shown in FIG. 4(a) and the plan thereof is shown in FIG. 4(b).

In the structure of the matrix type gas discharge display panel as shown in FIGS. 4(a) and 4(b), a cell sheet CS is sandwiched between a front glass plate FG and a rear glass plate RG. In the cell sheet SC, plural spaces provided for individually forming discharge cells are arranged in matrix, and fluorescent materials Ph are applied on inner walls of these spaces for discharge cells, meanwhile display anodes DA and cathodes C are provided on tops and bottoms of these spaces respectively. Gas discharges are individually generated in these cell spaces between the display anodes DA and the cathodes C and hence the fluorescent materials Ph are excited and radiated by the ultraviolet rays UV emitted by these gas discharges. The fluorescent materials Ph are separately applied for respectively radiating in red (R), green (G) and blue (B). So that, respective discharge cells are separately called as R cells, G cells and B cells. In the gas discharge display panel according to the present invention, each of the R cells, G cells and B cells arranged similarly as in the conventional panel are individually covered by respective filters RF, GF and BF provided for selectively respective colored lights on the rear surface of the front glass plate FG.

Each of these respective color filters RF, GF and BF are formed of inorganic glass materials composed as endurable against the heat treatment at high temperature in the sealing process with frit glass of the panel glass plate which are heated for one hour at the adhering temperature 430° C. These color filters can be formed, for instance, by printing the aforesaid glass paste on the rear surface of the front glass plate FG.

The color filters added onto the displaying side of the display element of the gas discharge display device according to the present invention as described above make the respective colored lights emit from those display elements without loss, as well as to prevent disturbing colored lights, which have the wavelengths residing outside the same range as the desired colored lights emitted from the respective display elements and included in the ambient light incident upon the respective display elements, from the reflection thereof by absorbing these disturbing colored lights. So that, these color filters, by necessity, are formed to be of the absorbing type for absorbing all of the disturbing lights other than the transferring colored lights. In addition, these color filters should be made so-called transparent layers, since the ambient light incident upon these filters should not be reflected and scattered therefrom.

In the situation where these color filters having the respective performances as described above are arranged over all of respective display elements, the colored lights emitted from the discharge cells forming respective display elements, for instance, the red light emitted from the R cell can be derived from the display panel through the respective color filter, for instance, through the red filter RF substantially without any loss. Further, the R component of the incident ambient light passes through the red filter RF and is reflected from the white fluorescent materials inside the discharge cell and again passes through the red filter, and hence derived also from the display surface. However, the G and the B components of the incident ambient light are, even if reflected by the white fluorescent materials Ph inside the R cells, absorbed twice through the red filters RF, and, as a result, extremely attenuated with the evident level difference from the red lights emitted the R cells. Consequently, even though the ambient light is incident upon the display surface, the high contrast display can be attained. This situation of display is just the same with regard to the G cell covered by G filter and the B cell covered by B filter.

In this connection, in the embodiment as shown in FIGS. 4(a) and 4(b), the black lattice consisting of black absorbing material, that is, so-called black matrix BM is provided between each discharge cells, so as to lower the reflectance outside the range of radiation from the display surface unconditionally and hence to further increase the high contrast based on the effect of the color filter accompanying with each discharge cells.

Next, examples of the relative radiation spectrum of fluorescent materials Ph applied onto each of discharge cells RC, GC and BC composed as mentioned above and the transmittance $\tau$ of each of color filters RF, GF and BF are shown in FIGS. 1, 2, and 3 respectively. In these examples as shown in these drawings, each of the primary colored radiation components are taken out approximately with the transmittance of 80%, meanwhile the reflected components other than primary color components of the incident ambient light are attenuated substantially into the zero level. As a result, in the situation where the numbers of each discharge cells RC, GC and BC are the same with each other, the overall luminous reflectance of the exemplified display device is lowered below $0.8^2 \times \frac{1}{3}$, that is, about 10%.

The idealized curves of the performances as shown in FIGS. 1 to 3 are shown in FIG. 5, although the practical performances are far from these idealized curves. The practical performances obtained from the present embodiment are shown in FIGS. 1 to 3 in comparison with those obtained from the aforesaid previously disclosed color filters. Similar data of these performances obtained on various conditions of the cell structure including the above mentioned are indicated in Table 3.

TABLE 3

| Cell structure | Compared item | | |
|---|---|---|---|
| | Brightness | Luminous reflectance | Contrast |
| Non-filter | 1.0 | 1.0 | 1.0 |
| Gray filter | 0.8 | 0.64 | 1.25 |
| Previous disclosure | 0.8 | 0.20 | 4.0 |
| Present disclosure | 0.8 | 0.13 | 6.0 |

As is apparent from Table 3, the decrease of brightness in the situation where the discharge cell is accompanied with the color filter is slight. Meanwhile, the contrast is increased by six times of that obtained without the accompanied color filter and by four times of that obtained with the gray filter having no color selectivity.

In addition, as is apparent from FIGS. 1 to 3, the above various performances obtained according to the present invention are further favorable and available for the monochromatic display device, which is arranged such as, in the structure as shown in FIGS. 4(a) and 4(b). Only one kind of fluorescent material and color filter are employed. Otherwise, the direct radiation of gas discharge is available without any fluorescent material.

As for well known examples of the discharge gas the radiation of which is directly available for display, neon for reddish orange, krypton for green and argon for blue can be exemplified. In this situation, it is necessary to somewhat increase the density of those color filters. This increase of density can be attained by raising the temperature or increasing the film thickness.

Further speaking in detail about the above mentioned embodiment, the color filters made of transparent inorganic material according to the present invention are arranged to entirely cover all of discharge cells by being sticked on the rear surface of the front glass plate as shown in FIGS. 4(a) and 4(b). In this situation as shown in those drawings, the display electrodes are arranged on the primary color filters RF, GF and BF sticked on the rear surface of the front glass plate FG by being deposited thereon in the manner such as well known. That is, good conductor metallic materials, for instance, Ni, Au, Ag, Cu, Cu-Al, Cr-Cu-Cr are deposited thereon by spattering, ion-plating, plating and the like, and further, if necessary, are applied with the etching for forming those electrodes together with lead conductors similarly customarily performed.

When those electrode materials formed as described above are fired, it is feared that the metallic materials of those electrodes deposited on the color filters are diffused into the materials forming those filters and hence the performances of those color filters are deteriorated. So that, it is preferable that the diffusion preventing layer is deposited between those materials or that metallic materials which can be fired at a possibly low temperature are selectively employed for those electrodes. As for the etching effected for forming those electrodes in the situation where those color filters are made of materials readily affected by the etching, it is required to protect those filter materials by being covered with any transparent layer for obstructing the etching liquid, which layer can be preferably formed of dielectric materials, for instance, $CaF_2$ and $Ta_2O_5$ customarily used for providing the color separating filter deposited inside the face plate of the single tube type color television camera tube.

In this connection, it is a matter of course that the above exemplified gas discharge display panel can be made similar as conventionally well known, except for the above mentioned.

Next, examples of display device other than gas discharge display panels, for instance, the cathode ray tube to be applied with the present invention will be described hereinafter.

As for arranging the aforesaid primary color filters inside the face plate of the cathode ray tube, particularly the color cathode ray tube according to the present invention, it is favorable to provide the filter materials thereon by coating and etching processes similar as effected for arranging fluorescent material dots thereon, since it is difficult to arrange those filters only by the aforesaid printing process on the basic of the fact that the face plate of the cathode ray tube is not flat similarly as described above and that the pitch of the arranged fluorescent material dots is distinctly smaller than that of discharge cells in the above described gas-discharge display panel. Accordingly, the aforesaid colored glass material for the primary color filter is uniformly coated into a thin layer overall of inner surface of the face plate, and, after drying or half firing, the photoresist is deposited overall of this thin layer of glass material. Thereafter, and similarly as for forming the fluorescent dots, those layers are exposed by the light source disposed at the deflection center of the electron beams through the shadow mask, and then the etching is applied, so as to leave the colored glass material only on the positions to be arranged with the primary color filters.

These processes of coating and etching of the colored glass materials are repeated with regard to respective primary colors, and further as for the black matrix, the similar process as for forming the fluorescent layer is carried out, and then the firing thereof is performed.

Thereafter, the conventional process for forming the fluorescent layers, and, as a result, the situation where the absorbing type color filters made of transparent inorganic material for transferring respective primary color lights are arranged overall of the respective primary color fluorescent dots can be obtained.

Next, an example of low velocity electron beam type fluorescent display panel applied with the present invention will be described hereinafter.

In the application of the present invention onto the display panel of this type, similarly as in the aforesaid gas-discharge display panel, firstly the colored glass filters having the desired shapes is sticked on the front glass plate, and then the transparent electrode layers are deposited thereon and further the fluorescent layers having the desired shapes provided for the excitation of the low velocity electron beam are deposited thereon. Behind the front glass plate arranged as described above, the grid electrodes, the electron beam generator and the like are provided similarly as in the conventional panel of this type.

The present invention can also be widely applied onto the display devices of various types other than those described above, including the flat face type cathode ray tube display device, the letter and figure display device and the like, in which device a plurality of light-emitting or light-controlling elements, for instance, so-called EL, namely, electro-luminescent elements, light-emitting diodes, liquid crystal display device are arranged in matrix or in segments with regard to plural color tones, with the similar operational effects as described above.

As described above in detail, in the monochromatic display device, the absorbing type color filter made of transparent inorganic material according to the present invention is uniformly or selectively applied with regard to a single color on the front or the rear surface of the front glass plate. Meanwhile, in the multicolor display device, these color filters are arranged separately for respective colors overall of the front sides of display elements, so as to transfer all of colored lights emitted from the multicolor display device substantially without any transmission loss and to absorb all of the unnecessary components of the incident ambient light with the extremely increased high contrast. However, the conventional method for preventing the reflection of the ambient light as described earlier can be adopted in common in the manner as described as follows, with the extremely distinct effect of the increase of contrast.

Similarly as in the conventional color cathode ray tube display device, to the front glass plate of the display device applied with the present invention is added with rare earth elements, for instance, $Nd_2O_3$, so as to facilitate the further increase of operational effect obtained by the color filter according to the present invention.

In addition, in the situation where the present invention is applied onto the color cathode ray tube display device, when the pigment is mixed into the fluorescent materials employed therefor, so as to absorb colored lights in the range other than that to be displayed, the operational effect of the color filter according to the present invention can be further increased.

On the other hand, the average reflectance of each of the display elements can be reduced into 10% or less than it, so that the reflectance of about 5% on the surface of the front glass plate becomes extremely significant in comparison with the conventional display device. Accordingly, the front surface of the front glass plate of the display device applied with the present invention can be applied with the low reflection coating with remarkable effect. The low reflection coating applied on the color glass filter reduces the reflection therefrom, so that the output radiation therefrom indicates a little increase. In this connection, this low reflection coating can be effected in the last stage of the manufacturing process of the display device according to the present invention. However, it is preferable that, in the step wherein the process for manufacturing the front glass plate is finished by applying the color filters of the present invention, the display anodes and others on the rear surface thereof, this low reflection coating is applied on the front surface thereof. In this situation, the coating material is affected by the heating procedure at about 430° C. included in the frit glass treating process for sealing the front and the rear glass plates with each other, so that it is preferable also to employ a heat-resisting coating material which is endurable against the high temperature as described above.

The optical filter according to the present invention can be utilized for color filters to be arranged in front of the cathode ray tube, as well as for the display of figures and the like on a glass plate, various kinds of shades, various kinds of decorations and others and further for various kinds of optical devices.

A picture having monochromatic half tone can be reproduced by superposing a picture printed with black glass paste upon the monochromatic filter according to the present invention.

The color filter of the present invention can be applied for displaying a fixed picture as well as for the stained glass like use.

A combination of tri-primary color filters available of the above use will be exemplified as follows.

Plural rows of minute color filters are arranged as shown in FIG. 6(a), so as to present the half tone by controlling the transmittance or the reflectances of those minute color filters.

As for the source of the picture to be displayed, a video signal used, for instance, for television broadcasting is adopted, which signal is stored in a frame memory. The video signal derived from the frame memory at an appropriate speed is applied for preparing an original manuscript and further a screen. In this step, the video signal has been sampled in response to the color arrangement as shown in FIG. 6(a), with the derivatives in response to the densities to be presented through the screen. These densities, that is, the deviations are controlled, for instance, by the area occupied with the black glass paste, as shown in FIG. 6(b). In the situation where the fixed picture reproduced through the above screen is viewed with the light passing therethrough, the saturation of the color of the color glass filter is increased. Meanwhile, in the situation where this fixed picture is viewed with the light reflected therefrom, the above saturation is decreased through the diffusing plane having a high reflectance, which is disposed on the filters and otherwise can be sticked upon the glass substrate. In this connection, it is possible also that the black glass paste as shown in FIG. 6(b) is printed directly or through the diffusing plane on the glass substrate and fired and thereafter combined with the color filters, so as to facilitate the display of colored picture, which can be changed by changing the picture drawn with the black glass paste only. The poster consisting of this colored picture based on the combination of the color filter and the monochromatic picture is substantially possible to be permanently preserved and hence applicable for the high grade of fine arts and further valuable for the commercial display on the basis of the durability against the ultraviolet ray, the high temperature and the high humidity.

As is apparent from the above description, the optical filter made of inorganic material according to the present invention can extremely reduce the reflectance of the display surface of various kinds of color display devices on the application thereof substantially without decrease of the display brightness. So that, it is possible to extremely increase the contrast of displayed picture thereon in comparison with that in the conventional device by preventing the reflection of incident ambient light, and otherwise to reduce the load of the display device by lowering the display brightness in the situation where the required contrast is maintained. Accordingly, even when the radiation efficiency of the display device is not so high, it is possible to obtain the excellent picture display with high contrast as well as to lower the sensitivity of the flicker interference by facilitating the low brightness display. As a result, the low field speed scanning of displayed picture can be realized.

Particularly in the situation where the present invention is applied onto the gas discharge display panel, the disturbing components of the radiation other than the required color components thereof can be absorbed and removed through the color filters according to the present invention, even if the radiation from the filled gas can be directly viewed, so that the decrease of the color purity of the displayed picture can be obviated. As a result, it is facilitated to employ the gases for instance, Ne, which cannot be employed for the gas discharge because of the direct view of the radiation therefrom, although the high brightness radiation can be obtained therefrom.

In this connection, the constituents of the color filters according to the present invention consist only of inorganic materials at least in the situation where these filters are practically used. So that, the deterioration of the performances which is caused by the light exposure, and further the impurities including the undesired gases are scarcely generated, even in the situation where those materials are sealed in the gaseous space of the gas discharge display panel. Consequently, according to the present invention, it is possible to obtain various evident effects such as the life of the gas discharge display panel is not inferiorly affected at all.

What is claimed is:

1. An optical filter made of inorganic material for red light, comprising,
   a glass substrate, and
   a layer sticked on said glass substrate and fired, which is made of inorganic materials including indispensable constituents consisting of copper sulfate 1 to 70 parts by weight, alkali metal sulfate 20 to 90 parts by weight and alkali earth metal sulfate 10 to 80 parts by weight.

2. An optical filter made of inorganic material for red light as claimed in claim 1, wherein said inorganic materials are pulverized and pasted by mixing with screen oil.

3. An optical filter made of inorganic material for red light as claimed in claim 2, wherein said inorganic materials are added with inorganic filling material 5 to 50 parts by weight.

4. An optical filter made of inorganic material for red light as claimed in claim 3, wherein said inorganic materials are further added with an organic vehicle.

5. An optical filter made of inorganic material for red light as claimed in claim 1, wherein a superficial portion of said glass substrate is tinned.

6. An optical filter made of inorganic material for red light as claimed in claim 1, wherein said alkali metal sulfate is selected from a group including lithium sulfate, sodium sulfate and potassium sulfate and said alkali earth metal sulfate is selected from a group including zinc sulfate, calcium sulfate, magnesium sulfate and barium sulfate.

7. An optical filter made of inorganic material for red light as claimed in claim 3, wherein said inorganic filling material is selected from a group including alumina, titanium oxide, zirconia, zirconium silicate, calcium carbonate and iron oxide.

* * * * *

UNITED STATES PATENT AND TRADEMARK OFFICE
CERTIFICATE OF CORRECTION

PATENT NO. : 4,626,071

DATED : December 2, 1986

INVENTOR(S) : Masatoshi WADA et al.

It is certified that error appears in the above-identified patent and that said Letters Patent is hereby corrected as shown below:

On the cover page, below the line "[22] Filed: Jun. 17, 1985" insert

--[30] Foreign Application Priority Data
  June 20, 1984 [JP] Japan . . . . 84125016--

Signed and Sealed this

Twenty-eighth Day of June, 1988

Attest:

DONALD J. QUIGG

Attesting Officer

Commissioner of Patents and Trademarks